United States Patent [19]

Coispeau et al.

[11] 4,116,954
[45] Sep. 26, 1978

[54] 5-[4-(N-TRIFLUOROETHYL-AMINO)-PHENYLAZO]-PYRAZOLIUM DYESTUFFS

[75] Inventors: Gerard Emile Edgard Coispeau, Soisy Sous Montmorency; Jacques Pierre Edmond Pechmeze, Paris, both of France

[73] Assignee: Produits Chimiques Ugine Kuhlmann, Paris, France

[21] Appl. No.: 714,079

[22] Filed: Aug. 12, 1976

[30] Foreign Application Priority Data

Oct. 28, 1975 [FR] France .................. 75 32860

[51] Int. Cl.$^2$ .............. C09B 29/00; C09B 29/08; D06P 1/04; D06P 1/10
[52] U.S. Cl. ...................... 260/162; 260/147; 260/163; 260/558 R; 260/562 R; 260/573; 260/577
[58] Field of Search .................. 260/163, 162, 147

[56] References Cited

U.S. PATENT DOCUMENTS

| 2,516,303 | 7/1950 | Dickey | 260/207.5 |
| 2,618,630 | 11/1952 | Dickey | 260/207.3 |
| 3,515,715 | 6/1970 | Straley et al. | 260/163 |
| 3,948,878 | 4/1976 | Coispeau | 260/147 |

FOREIGN PATENT DOCUMENTS

| 2,043,789 | 2/1971 | France | 260/158 |
| 2,150,528 | 4/1973 | France | 260/157 |

| 1,388,290 | 3/1975 | United Kingdom | 260/163 |

Primary Examiner—Floyd D. Higel
Attorney, Agent, or Firm—Beveridge, DeGrandi, Kline & Lunsford

[57] ABSTRACT

New cationic pyrazole dyestuffs are disclosed represented by the general formula:

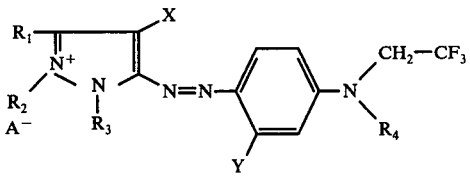

wherein one of the symbols $R_1$ and $R_3$ represents an alkyl group and the other a phenyl, chlorophenyl or methoxyphenyl group; $R_2$ represents an alkyl group; $R_4$ represents a hydrogen atom or an alkyl, hydroxyalkyl, halogenoalkyl, alkoxyalkyl or acylaminoalkyl group; X represents a hydrogen or chlorine atom; Y represents a hydrogen or halogen atom or a methyl, alkoxy or acetylamino group; and $A^-$ represents a monovalent anion. These pyrazole dyestuffs can be used for dyeing or printing of fibers based on polymers or copolymers of acrylonitrile and fibers based on polyamides or polyesters modified by acid groups.

1 Claim, No Drawings

5-[4-(N-TRIFLUOROETHYL-AMINO)-PHENYLAZO]-PYRAZOLIUM DYESTUFFS

The present invention relates to new cationic pyrazole dyestuffs which are particularly suitable for the dyeing and printing of fibers based on polymers and copolymers of acrylonitrile and fibers based on polyamides or polyesters modified by acid groups.

These new dyestuffs may be represented by the following general structural formula:

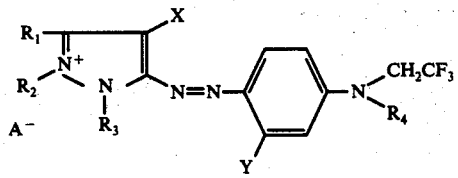

(I)

wherein:

one of the symbols $R_1$ and $R_3$ represents alkyl and the other phenyl, chlorophenyl or methoxyphenyl; that is when one of $R_1$ or $R_3$ is alkyl then the other one of $R_1$ or $R_3$ must be phenyl, chlorophenyl or methoxyphenyl;

$R_2$ represents alkyl;

$R_4$ represents hydrogen, alkyl, hydroxyalkyl, halogenoalkyl, alkoxyalkyl or acylaminoalkyl;

X represents hydrogen or chlorine;

Y represents hydrogen, halogen, methyl, alkoxy or acetylamino; and $A^-$ represents a monovalent anion.

In the preceding definitions, the alkyl and alkoxy groups preferably contain 1 to 4 carbon atoms. The acyl residue of the acylaminoalkyl group which may be represented by $R_4$ is preferably that of an aliphatic carboxylic acid containing 1 to 4 atoms of carbon (e.g. acetyl) or an aromatic acid (e.g. benzoyl). The halogen atom which Y may represent or which may be present in the halogenoalkyl group which $R_4$ may represent is preferably chlorine.

The dyes of formula (I) can be prepared by coupling the diazo derivative of an amino-pyrazole represented by the formula:

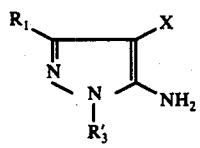

(II)

with an N-trifluoroethyl-aniline having the formula:

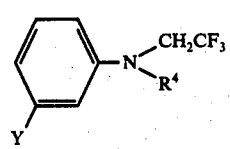

(III)

The compound resulting from the coupling reaction is a monoazo compound which has the formula:

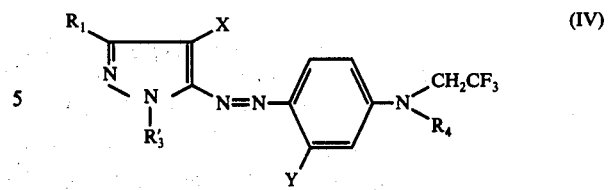

(IV)

The ultimate compound of formula I is obtained by treating IV with an alkylation agent.

In the formulae (II), (III) and (IV) $R'_3$ represents a hydrogen atom when $R_1$ is a phenyl, chloro-phenyl or methoxyphenyl group, or a phenyl, chlorophenyl or methoxyphenyl group when $R_1$ is an alkyl group, and $R_4$, X and Y are as defined above.

Diazotization of the amino-pyrazoles of formula (II) is carried out in the presence of an organic acid having a low molecular weight, such as acetic or propionic acid, or in the presence of concentrated mineral acid.

The treatment of the monoazo of formula (IV) with the alkylation agent can be carried out in the presence of excess alkylation agent or in the presence of an organic solvent such as benzene hydrocarbons and their chlorinated derivatives, dimethyl formamide or chloroform. Alkyl halogenides or alkyl arylsulphonates, or dimethyl or diethyl sulphate can be used as the alkylation agent.

The dyestuffs in accordance with the present invention have an excellent affinity for fibers based on homopolymers or copolymers of acrylonitrile or based on polyamides or polyesters modified by acid groups, and yield bright yellow to orange shades which are full bodied and have excellent fastness, especially to light.

By excellent affinity is meant a very high take up capacity onto the fibers, and consequently excellent exhaustion of the dyeing vats.

The anion $A^-$ has no tictorial role. It can be replaced with any other anion if required; for example, to increase the solubility in water.

The anion $A^-$ is well known in the art and a few illustrative examples are listed here: chloride, sulphomethylate, sulphoethylate, chlorozincate, acetate, nitrate, bicarbonate, p-toluenesulphonate.

In the following non-limiting examples, the parts are by weight in the absence of any specific indication to the contrary.

EXAMPLE 1

16 parts of 3(5)-phenyl 5(3)-amino pyrazole are dissolved in 80 parts by volume of concentrated sulphuric acid. The solution is cooled to between 0° and 5° C and to it is added a solution of 7.4 parts of sodium nitrite in 80 parts by volume of concentrated sulphuric acid. The mixture is stirred for half an hour and then the sulphuric solution of the diazo derivative is added a little at a time to a solution of 21 parts of N-ethyl N-trifluoroethyl aniline in 200 parts by volume of acetic acid. The acidity of the mixture is reduced to a pH level of 4 by adding ammonia, and the precipitate is filtered, washed and dried.

15 parts of the 3(5)-phenyl 5(3-(N-ethyl N-trifluoroethyl 4-amino phenylazo) pyrazole thus obtained are dissolved in 30 parts by volume of dimethylformamide at 90° C. 15 parts by volume of dimethyl sulphate are then added a little at a time and the reaction mixture is held at 100° C for 10 hours. The solution is then cooled and the dye is precipitated by adding 200 parts by volume of a 20% sodium chloride solution, then filtered and dried.

The chloride of 3-(N-ethyl N-trifluoroethyl 4-amino phenylazo) 5-phenyl 1,2-dimethyl pryazolium thus obtained dyes fibers based on homopolymers or copolymers of acrylonitrile a golden yellow shade which is fresh, lively and remarkably light fast.

Table A below summarizes other examples of dyestuffs in accordance with the invention, prepared as in the preceding example except in that the N-ethyl N-trifluoroethyl aniline is replaced with an equimolar quantity of the coupling component shown in the second column.

TABLE A

| Ex. | Coupling component | Shade on acrylic fibers |
|---|---|---|
| 2 | N-trifluoroethyl-aniline | golden yellow |
| 3 | N-trifluoroethyl N-beta-chloroethyl aniline | golden yellow |
| 4 | N-trifluoroethyl N-ethyl N'-acetyl metaphenylenediamine | orange |
| 5 | N-trifluoroethyl N-ethyl metachloro-aniline | golden yellow |
| 6 | N-trifluoroethyl N-beta-hydroxyethyl aniline | golden yellow |
| 7 | N-trifluoroethyl N-ethyl meta-anisidine | orange |

EXAMPLE 8

23 parts of 3(5)-phenyl 4-chloro 5(3)-amino pyrazole are dissolved in 130 parts of concentrated sulphuric acid. The solution is cooled to between 0° and 5° C and to it is added a solution of 7.4 parts of sodium nitrite in 130 parts of concentrated sulphuric acid. The mixture is stirred for half an hour and then the sulphuric solution of the diazo derivative is added a little at a time to a solution of 21 parts of N-ethyl N-trifluoroethyl aniline in 200 parts of acetic acid. The pH of the solution is slowly raised to 4 by adding ammonia, and the precipitate is then filtered, washed and dried.

18 parts of the 4-chloro 3(5)-phenyl 5(3)-(N-ethyl N-trifluoroethyl 4-amino phenylazo) pyrazole obtained in this way are dissolved in 30 parts of dimethylformamide at 80° C. 24 parts of dimethyl sulphate are then added a little at a time and the reaction mixture is held at 100° C for about 10 hours. The solution is then cooled and the dye is precipitated by adding sodium chloride solution, and then filtered and dried.

The chloride of 3-(N-ethyl N-trifluoroethyl 4-amino phenylazo) 4-chloro 5-phenyl 1,2-dimethyl pyrazolium obtained in this way dyes fibers based on homopolymers or copolymers of acrylonitrile an organge shade which is lively and remarkably light fast.

Table B below summarizes other examples of dyestuffs in accordance with the invention, prepared as in the preceding example, except in that the N-ethyl N-trifluoroethyl aniline is replaced with an equimolar quantity of the coupling component shown in the second column.

TABLE B

| Ex. | Coupling component | Shade on acrylic fibers |
|---|---|---|
| 9 | N-trifluoroethyl aniline | orange |
| 10 | N-trifluoroethyl N-chloroethyl aniline | orange |
| 11 | N-trifluoroethyl N-ethyl N'-acetyl metaphenylenediamine | orange |
| 12 | N-ethyl N-trifluoroethyl metachloro. aniline | orange |
| 13 | N-ethyl N-trifluoroethyl meta-anisidine | orange |
| 14 | N-ethyl N-trifluoroethyl metatoluidine | orange |

Table C below summarizes other examples of dyestuffs in accordance with the invention, prepared as in examples 1 or 8 from the amino-pyrazole shown in the second column and the coupling component shown in the third column. The dyestuffs of Table C produce an orange shade on acrylic fibers.

TABLE C

| Ex. | Amino-pyrazole of formula (II) | Coupling component of formula (III) |
|---|---|---|
| 15 | 4-methoxy 3(5)-phenyl 5(3)-amino pyrazole | N-trifluoroethyl N-ethyl aniline |
| 16 | 4-methoxy 3(5)-phenyl (5)3-amino pyrazole | N-trifluoroethyl N-ethyl meta-anisidine |
| 17 | 4-chloro 3(5)-phenyl 5(3)-amino pyrazole | N-trifluoroethyl N-ethyl aniline |
| 18 | 4-chloro 3(5)-phenyl 5(3)-amino pyrazole | N-trifluoroethyl N-ethyl meta-toluidine |
| 19 | 1-phenyl 3-methyl 4-chloro 5-amino pyrazole | N-trifluoroethyl N-ethyl aniline |
| 20 | 4-methoxy 3(5)-phenyl 4-chloro 5(3)-amino pyrazole | N-trifluoroethyl N-ethyl aniline |
| 21 | 4-methoxy 3(5)-phenyl 4-chloro 5(3)-amino pyrazole | N-trifluoroethyl N-ethyl meta-anisidine |
| 22 | 4-chloro 3(5)-phenyl 4-chloro 5(3)-amino pyrazole | N-trifluoroethyl N-ethyl aniline |
| 23 | 4-chloro 3(5)-phenyl 4-chloro 5(3)-amino pyrazole | N-trifluoroethyl N-ethyl meta-toluidine |
| 24 | 1-phenyl 3-methyl 5-amino pyrazole | N-trifluorethyl N-ethyl aniline |
| 25 | 1-phenyl 3-methyl 4-chloro 5-amino pyrazole | N-trifluoroethyl N-ethyl meta-toluidine |
| 26 | 1-phenyl 3-methyl 5-amino pyrazole | N-trifluoroethyl N-ethyl meta-toluidine |

Further modifications and variations of the invention will be apparent to those skilled in the art.

We claim:

1. A dyestuff represented by the formula

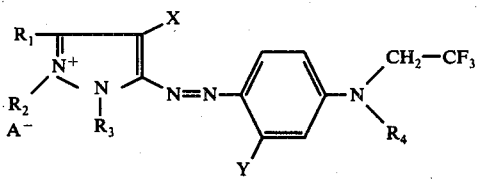

wherein:
one of $R_1$ and $R_3$ is alkyl containing 1 to 4 carbon atoms and the other is phenyl, chlorophenyl or methoxyphenyl;
$R_2$ is alkyl containing 1 to 4 carbon atoms;
$R_4$ is hydrogen, alkyl containing 1 to 4 carbon atoms, or alkyl containing 1 to 4 carbon atoms and substituted by hydroxy, chlorine, alkoxy containing 1 to 4 carbon atoms or acylamino, the acyl residue of said acylamino being that of an aliphatic carboxylic acid containing 1 to 4 carbon atoms or benzoyl;
X is hydrogen or chlorine;
Y is hydrogen, chlorine, methyl, alkoxy containing 1 to 4 carbon atoms or acetylamino; and
$A^-$ is a monovalent anion.

* * * * *